(12) United States Patent
Hammonds et al.

(10) Patent No.: US 12,172,365 B2
(45) Date of Patent: Dec. 24, 2024

(54) ADDITIVE MANUFACTURING METHOD FOR MAKING A THREE-DIMENSIONAL OBJECT

(71) Applicant: SOLVAY SPECIALTY POLYMERS USA, LLC, Alpharetta, GA (US)

(72) Inventors: Ryan Hammonds, Atlanta, GA (US); Mohammad Jamal El-Hibri, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 343 days.

(21) Appl. No.: 17/612,086

(22) PCT Filed: May 14, 2020

(86) PCT No.: PCT/EP2020/063412
§ 371 (c)(1),
(2) Date: Nov. 17, 2021

(87) PCT Pub. No.: WO2020/234096
PCT Pub. Date: Nov. 26, 2020

(65) Prior Publication Data
US 2022/0212398 A1 Jul. 7, 2022

Related U.S. Application Data

(60) Provisional application No. 62/851,182, filed on May 22, 2019.

(30) Foreign Application Priority Data

Jun. 27, 2019 (EP) ..................... 19183000

(51) Int. Cl.
| | | |
|---|---|---|
| *B33Y 80/00* | (2015.01) |
| *B29C 64/118* | (2017.01) |
| *B29C 64/314* | (2017.01) |
| *B29C 64/336* | (2017.01) |
| *B33Y 10/00* | (2015.01) |
| *B33Y 40/10* | (2020.01) |
| *B33Y 70/00* | (2020.01) |
| *C08L 71/00* | (2006.01) |
| *C08L 79/08* | (2006.01) |
| *B29K 71/00* | (2006.01) |
| *B29K 79/00* | (2006.01) |
| *B29K 105/00* | (2006.01) |
| *B29K 105/16* | (2006.01) |

(52) U.S. Cl.
CPC .......... *B29C 64/118* (2017.08); *B29C 64/314* (2017.08); *B29C 64/336* (2017.08); *B33Y 10/00* (2014.12); *B33Y 40/10* (2020.01); *B33Y 70/00* (2014.12); *C08L 71/00* (2013.01); *C08L 79/08* (2013.01); *B29K 2071/00* (2013.01); *B29K 2079/085* (2013.01); *B29K 2105/0005* (2013.01); *B29K 2105/0032* (2013.01); *B29K 2105/0038* (2013.01); *B29K 2105/0088* (2013.01); *B29K 2105/16* (2013.01); *B29K 2995/0097* (2013.01)

(58) Field of Classification Search
CPC .............. B29C 64/118; B29K 2071/00; B29K 2079/085; B29K 2105/0005; B29K 2105/0032; B29K 2105/0038; B29K 2105/16; B33Y 10/00; B33Y 70/00
USPC .................. 264/308, 331.11, 331.12, 331.19
See application file for complete search history.

(56) References Cited

U.S. PATENT DOCUMENTS

| | | | |
|---|---|---|---|
| 5,164,466 A | 11/1992 | El-Hibri et al. | |
| 2015/0145168 A1* | 5/2015 | Rodgers | B29C 64/118 |
| | | | 264/308 |

FOREIGN PATENT DOCUMENTS

| | | | | |
|---|---|---|---|---|
| WO | WO-2017100447 A1 * | 6/2017 | .......... | B29C 64/118 |
| WO | 2017167691 A1 | 10/2017 | | |
| WO | 2017167692 A1 | 10/2017 | | |
| WO | WO-2017186921 A1 * | 11/2017 | .............. | C08L 71/12 |
| WO | 2018141973 A1 | 8/2018 | | |
| WO | 2019053237 A1 | 3/2019 | | |
| WO | 2019055737 A1 | 3/2019 | | |

* cited by examiner

*Primary Examiner* — Leo B Tentoni
(74) *Attorney, Agent, or Firm* — Osha Bergman Watanabe & Burton LLP

(57) ABSTRACT

The present disclosure relates to an additive manufacturing (AM) method for making a three-dimensional (3D) object, using a part material (M) comprising at least one poly(ether ketone ketone) (PEKK) polymer, in particular to a 3D object obtainable by Fused Deposition Modelling (FDM) or Fused Filament Fabrication (FFF) from this part material (M).

8 Claims, No Drawings

ADDITIVE MANUFACTURING METHOD FOR MAKING A THREE-DIMENSIONAL OBJECT

RELATED APPLICATIONS

This application is a U.S. national stage entry under 35 U.S.C. § 371 of international patent application No. PCT/EP2020/063412 filed on May 14, 2020, which claims priority to U.S. provisional patent application No. 62/851,182, filed on May 22, 2019, and to European patent application No.19183000.9, filed on Jun. 27, 2019, the whole content of each of these applications being explicitly incorporated herein by reference.

TECHNICAL FIELD

The present disclosure relates to an additive manufacturing (AM) method for making a three-dimensional (3 D) object, using a part material (M) comprising at least one poly(ether ketone ketone) (PEKK) polymer, in particular to a 3 D object obtainable by Fused Deposition Modelling (FDM) or Fused Filament Fabrication (FFF) from this part material (M).

BACKGROUND

Additive manufacturing systems are used to print or otherwise build 3 D parts from digital representations of the 3 D parts using one or more additive manufacturing techniques. Examples of commercially available additive manufacturing techniques include extrusion-based techniques, selective laser sintering, powder/binder jetting, electron-beam melting and stereolithography processes. For each of these techniques, the digital representation of the 3 D part is initially sliced into multiple horizontal layers. For each sliced layer, a tool path is then generated, which provides instructions for the particular additive manufacturing system to print the given layer.

For example, in an extrusion-based additive manufacturing system, a 3 D part may be printed from a digital representation of the 3 D part in a layer-by-layer manner by extruding and adjoining strips of a part material. The part material is extruded through an extrusion tip carried by a print head of the system, and is deposited as a sequence of roads on a platen in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3 D part resembling the digital representation. An example of extrusion-based additive manufacturing system starting from filaments is called Fused Filament Fabrication (FFF), also known as Fused Deposition Modelling (FDM). Pellet Additive Manufacturing (PAM) is another example of an extrusion-based 3 D printing method capable of printing raw materials in pellet form.

Patent application WO 2019/055737 describes material extrusion additive manufacturing processes, including fused filament fabrication, which may be used to manufacture parts, devices, and prototypes using thermoplastic polymer compositions comprising polyarylketones such as poly(ether ketone ketone) (PEKK) having a specific T/I ratio. The PEKK polymer of the printed article remains amorphous and the printed article needs to be heat-treated to create crystallinity in the printed objects.

The Applicant has identified a polymer combination which makes possible the extrusion-based 3 D manufacture of objects or parts, which do not need to be heat-treated after printing. Parts printed from the polymer combination of the present invention are particularly well-suited for applications where transparency is required, for example in aircraft applications.

DISCLOSURE OF THE INVENTION

The present invention relates to a method for manufacturing a three-dimensional (3 D) object using an additive manufacturing system, such as an extrusion-based additive manufacturing system (for example FFF or FDM).

The 3 D objects or articles obtainable by such method of manufacture can be used in a variety of final applications. Mention can be made in particular of implantable device, medical device, dental prostheses, brackets and complex shaped parts in the aerospace industry and under-the-hood parts in the automotive industry.

The method of the present invention comprises a step of printing layers of the three-dimensional (3 D) object from a part material (M). The part material (M) may be in the form of filaments and be used in extrusion-based additive manufacturing system starting from filaments, called Fused Filament Fabrication (FFF), also known as Fused Deposition Modelling (FDM). The part material may also be in the form of pellets and be used in a 3D printing technology capable of printing raw materials in pellet form (PAM).

The present invention generally relates to an additive manufacturing (AM) method for making a 3 D object, comprising extruding a part material (M) comprising a polymer component comprising:
  from 55 to 99 wt. % of at least one poly(ether ketone ketone) (PEKK) polymer, and
  from 1 to 45 wt. % of at least one poly(ether imide) (PEI) polymer, preferably having a glass transition temperature (Tg) between 130° C. and 250° C., and no melting peak on the second heat, as measured by differential scanning calorimetry (DSC) according to ASTM D3418 using heating and cooling rates of 20° C./min,
  based on the total weight of the polymer component.

The merit of the applicant has been to surprisingly identify that the combination of poly(ether ketone ketone) (PEKK) polymer and poly(ether imide) (PEI) polymer makes possible the manufacture of 3 D objects having a satisfactory set of properties. More precisely, the applicant shows that the printed parts have a good set of mechanical properties (i.e. tensile strength and modulus of elasticity), without the need to heat-treat the articles after printing, as well as good optical properties, i.e. transparency.

The expression "polymer" or "copolymer" is hereby used to designate homopolymers containing substantially 100 mol. % of the same recurring units and copolymers comprising at least 50 mol. % of the same recurring units, for example at least about 60 mol. %, at least about 65 mol. %, at least about 70 mol. %, at least about 75 mol. %, at least about 80 mol. %, at least about 85 mol. %, at least about 90 mol. %, at least about 95 mol. % or at least about 98 mol. %.

The expression "part material" hereby refers to a blend of material, notably polymeric compounds, intended to form a 3 D object or a part of the 3 D object. The part material (M) is according to the present invention used as feedstocks to be used for the manufacture of 3 D objects or part of 3 D objects.

The method of the present invention employs two distinct polymers as main elements of the part material, which can for example be shaped in the form of filaments to build a 3 D object (e.g. a 3D model, a 3D article or a 3D part). The polymers may also be printed in the form of pellets, for example pellets of polymer blends.

In the present application:
any description, even though described in relation to a specific embodiment, is applicable to and interchangeable with other embodiments of the present invention;
where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
any recitation herein of numerical ranges by endpoints includes all numbers subsumed within the recited ranges as well as the endpoints of the range and equivalents.

According to an embodiment, the part material is in the form of a filament. The expression "filament" refers to a thread-like object or fiber or strand formed of a material or blend of materials which, according to the present invention, comprises at least the combination of the PEKK and PEI polymers.

The filament may have a cylindrical or substantially cylindrical geometry, or may have a non-cylindrical geometry, such as a ribbon filament geometry; further, filament may have a hollow geometry, or may have a core-shell geometry, with another polymeric composition, being used to form either the core or the shell.

According to an embodiment of the invention, the method for manufacturing a 3 D object with an AM system comprises a step consisting in extruding the part material (M). This step may, for example, occur when printing or depositing strips or layers of part material (M). The method for manufacturing 3 D objects with an extrusion-based additive manufacturing system is also known as Fused Filament Fabrication technique (FFF), Fused Deposition Modelling (FDM), as well as Pellet Additive Manufacturing technique (PAM).

FFF/FDM 3D printers are, for example, commercially available from Apium, from Roboze, from Hyrel or from Stratasys, Inc. (under the trade name Fortus®). SLS 3D printers are, for example, available from EOS Corporation under the trade name EOSINT® P. FRTP 3D printers are, for example, available from Markforged.

PAM 3D printers are, for example, commercially available from Pollen. BAAM (Big Area Additive Manufacturing) is an industrial sized, additive machine commercially available from Cincinnati Inc.

Extrusion-based 3D printing processes, such as FFF and FDM, rely on filament extrusion in a layer-by-layer fashion, which results in the formation of 3 D objects with a multitude of weld lines between the extruded layers. It is possible and described in the literature (e.g. U.S. Pat. No. 5,164,466A) to use double-gated injection molding of ASTM D638 Type I tensile specimens as a proxy for 3D printing, as this process fills the mold cavity from both tabs and results in the formation of a butt weld joint at the center of the gauge length of the tensile specimen from the two melt flow fronts meeting head on at this plane referred to as the weld line. This method has the benefit of providing higher throughput as compared to 3D printing processes and subsequent tensile testing in a direction orthogonal to the 3D printed layers.

Part Material

The part material (M) employed in the method of the present invention comprises a polymeric component comprising, based on the total weight of the polymeric component:
from 55 to 99 wt. % of at least one poly(ether ketone ketone) (PEKK) polymer, and
from 1 to 45 wt. % of at least one poly(ether imide) (PEI) polymer.

The applicant has found that part material (M) based on the combination of polymers as detailed above advantageously presents, when used to manufacture 3 D objects, a good set of properties, for example a good mechanical property profile (i.e. tensile strength and modulus of elasticity) in comparison to neat resins, notably without further heat-treating the printing articles. The applicant also demonstrates that part material (M) of the present invention allow manufacturing articles of good optical quality, that-is-to-say high transparency (i.e. limited haze).

The part material (M) of the invention may include other components. For example the part material may comprise at least one additive, notably at least one additive selected from the group consisting of fillers, colorants, lubricants, plasticizers, stabilizers, flame retardants, nucleating agents, flow enhancers and combinations thereof. Fillers in this context can be reinforcing or non-reinforcing in nature.

In embodiments that include fillers, the concentration of the fillers in the part material ranges from 0.1 wt. % to 60 wt. %, with respect to the total weight of the part material. Suitable fillers include calcium carbonate, magnesium carbonate, glass fibers, graphite, carbon black, carbon fibers, carbon nanofibers, graphene, graphene oxide, fullerenes, talc, wollastonite, mica, alumina, silica, titanium dioxide, kaolin, silicon carbide, zirconium tungstate, boron nitride and combinations thereof.

In embodiments that include fillers, the amount of fillers in the material (M) ranges from 0.5 wt. % to 30 wt. %, with respect to the total weight of the material (M). Suitable fillers include calcium carbonate, magnesium carbonate, glass fibers, graphite, carbon black, carbon fibers, carbon nanofibers, graphene, graphene oxide, fullerenes, talc, wollastonite, mica, alumina, silica, titanium dioxide, kaolin, silicon carbide, zirconium tungstate, boron nitride and combinations thereof.

According to a first embodiment, the part material (M) of the present invention comprises a polymeric component comprising:
from 55 to 98 wt. %, from 57 to 97 wt. %, from 58 to 96 wt. % or from 59 to 95 wt. % of at least one poly(ether ketone ketone) (PEKK) polymer,
from 2 to 45 wt. %, from 3 to 43 wt. %, from 4 to 40 wt. % or from 5 to 35 wt. % of at least one PEI polymer, based on the total weight of the polymeric component.

According to second embodiment, the part material (M) of the present invention comprises a polymeric component comprising:
from 77 to 99 wt. %, from 78 to 97 wt. %, from 79 to 96 wt. % or from 80 to 95 wt. % of at least one poly(ether ketone ketone) (PEKK) polymer,
from 1 to 23 wt. %, from 3 to 22 wt. %, from 4 to 21 wt. % or from 5 to 20 wt. % of at least one PEI polymer, based on the total weight of the polymeric component.

According to the second embodiment, the part material (M) of the present invention even preferably comprises a polymeric component comprising:
- from 85 to 99 wt. %, from 86 to 97 wt. %, from 87 to 96 wt. % or from 88 to 95 wt. % of at least one poly(ether ketone ketone) (PEKK) polymer,
- from 1 to 15 wt. %, from 3 to 14 wt. %, from 4 to 13 wt. % or from 5 to 12 wt. % of at least one PEI polymer, based on the total weight of the polymeric component.

According to the second embodiment, the part material (M) presents a crystallinity which is such that no support structure is needed to print the 3D objects or articles. Indeed, the inventors show that, when the weight content of PEKK material is at least 77% based on the total weight of the part material (M), the crystallinity of the printed part is such that it is advantageously possible to print the part material without any support structure in a chamber heated above the glass transition temperature (Tg) of the material. In other words, the 3D printed structure supports itself as layers build up, and a support structure is not needed for the printing.

The part material may also comprise an amorphous polymer P2 selected from the group consisting of poly(biphenyl ether sulfone) (PPSU) polymer and thermoplastic polyimide (TPI) polymer.

The part material (M) may also comprise from 0 to 30 wt. % of at least one additive, for example selected from the group consisting of flow agents, fillers, colorants, dyes, pigments, lubricants, plasticizers, flame retardants (such as halogen and halogen free flame retardants), nucleating agents, heat stabilizer, light stabilizer, antioxidants, processing aids, nanofillers and electromagnetic absorbers, based on the total weight of the part material (M).

According to an embodiment, the 3D printed part material has an enthalpy of fusion ($\Delta Hf$), also called "heat of fusion", of at least 30 J/g, preferably at least 31 J/g, more preferably at least 32 J/g, as determined on the $2^{nd}$ heat scan in differential scanning calorimeter (DSC) according to ASTM D3418, using a heating rate of 20° C./min. The heat of fusion is calculated as the difference between the absolute value of the melting endotherm area minus the absolute value of any crystallization endotherm that may be detected during the first heat up scan.

According to an embodiment, the 3D printed part material has an enthalpy of fusion ($\Delta Hf$), also called "heat of fusion", of less than 70 J/g, preferably less than 65 J/g, more preferably less than 60 J/g, determined on the $2^{nd}$ heat scan in differential scanning calorimeter (DSC) according to ASTM D3418, using heating and cooling rates of 20° C./min.

In some embodiments, the polymer component of the part material (M) comprises at least 80 wt. % of the blend of PEKK and PEI polymers, based on the total weight of polymeric component of the part material (M). For example, the polymer component comprises at least 85 wt. % of the blend of PEKK and PEI polymers, at least 90 wt. %, at least 95 wt. %, at least 96 wt. %, at least 97 wt. %, at least 98 wt. % or at least at least 99 wt. % of the polymeric component of the part material (M).

In some embodiments, the polymer component of the part material (M) consists in a blend of PEKK and PEI polymers.

In some embodiments, the part material (M) comprises at least 80 wt. % of the blend of PEKK and PEI polymers, based on the total weight of part material (M). For example, the part material (M) comprises at least 85 wt. % of the blend of PEKK and PEI polymers, at least 90 wt. %, at least 95 wt. %, at least 96 wt. %, at least 97 wt. %, at least 98 wt. % or at least at least 99 wt. % of the part material (M).

In some embodiments, the part material (M) consists in a blend of PEKK and PEI polymers.

Poly(ether ketone ketone) (PEKK)

In some embodiments, the PEKK described herein comprises at least one recurring unit ($R^M$) and at least one recurring unit ($R^P$), wherein recurring unit ($R^M$) is represented by formula (M):

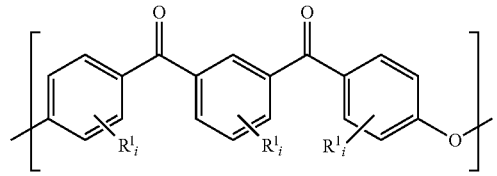

and recurring unit ($R^P$) is represented by formula (P):

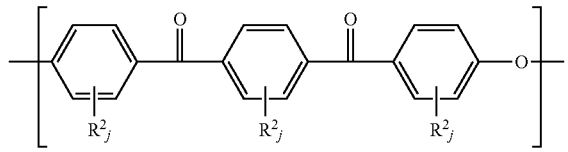

wherein:
each $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
each i and j, at each instance, is an independently selected integers ranging from 0 to 4.

According to an embodiment, $R^1$ and $R^2$ are, at each location in formulas (M) and (P) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to another embodiment, i and j are zero for each $R^1$ and $R^2$ group. In other words, recurring units ($R^P$) and ($R^M$) are both unsubstituted. According to this embodiment, recurring units ($R^M$) and ($R^P$) are respectively represented by formulas (M') and (P'):

(M')

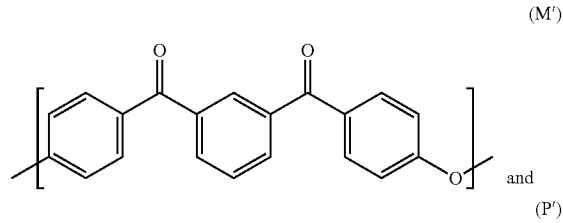

and (P')

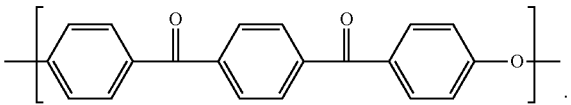

According to another embodiment, the PEKK polymer comprises at least one recurring unit ($R^M$), at least one recurring unit ($R^P$), and at least 50 mol. % of recurring units ($R^P$) and ($R^M$) of formulas (M), (P), (M') and/or (P'), the mol. % being based on the total number of moles in the polymer.

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in the PEKK are recurring units ($R^P$) and ($R^M$) of formulas (M), (P), (M') and/or (P'), the mol. % being based on the total number of moles in the polymer.

The PEKK preferably has a ratio of recurring units ($R^P$)/($R^M$) ranging from 60/40 to 95/5, more preferably from 63/37 to 91/9 or from 65/35 to 85/15.

The part material (M) of the present invention being composed of PEKK as a major component combined with at least one miscible polymer as a minor component offers multiple possibilities to adjust the properties of the material to the desired final part. For example, the part material can be made of 85 wt. % of a PEKK having a ratio ($R^P$)/($R^M$) in the range 80/20 to 95/5 and 15 wt. % of PEI. As another example, the part material can be made of 95 wt % of a PEKK having a ratio ($R^P$)/($R^M$) in the range 65/35 to 80/20 and 5 wt. % of PEI.

The PEKK may have one or two melting temperatures, Tm (° C.). Melting temperatures are measured on the $1^{st}$ heat scan by differential scanning calorimetry (DSC) according to ASTM D3418. For the sake of clarity, when reference is made, in the present application, to the melting temperature of the PEKK polymer, reference is in fact made to the highest Tm in case the PEKK has two Tm temperatures.

In one embodiment of the invention, the PEKK polymer used to prepare the polymer material (M) of the invention presents a low volatiles content, which makes it well-suited for applications such as the manufacture of 3 D objects using a AM system in which the material is heated at a high temperature. The volatiles content is defined as the amount of volatiles present in the part material (M) of the invention before use. This amount should be as low as possible in order to limit the off-gassing, that is to say the gradual release of these volatiles when using the material. Off-gazing can for example take place notably when heating the filament, just before extruding the material to form/print the 3 D object.

The volatiles content of the PEKK polymer to be used in the part material (M) of the invention is hereby assessed using thermogravimetry (TGA) according to ASTM D3850 method. The temperature Td, at which a determined amount of volatile materials (e.g. 1 wt. % or 2 wt. %) leave the sample, is determined by heating progressively the sample from 30° C. to 800° C. under nitrogen using a heating rate of 10° C./min. The temperature Td(1%) is also called the thermal decomposition temperature at 1 wt. %. According to the present invention, Td(1%) should be as high as possible in order to limit the amount of volatiles generated when heating the powder in the powder bed of the SLS printer.

In an embodiment of the invention, the PEKK polymer has a Td(1%) of at least 500° C., preferably 505° C., more preferably 510° C., as measured by thermal gravimetric analysis according to ASTM D3850, heating from 30° C. to 800° C. under nitrogen using a heating rate of 10° C./min. This means that the polymer retains 99 wt. % or more of its initial weight after being heated to a temperature of 500° C. or above, when measured in accordance with ASTM D3850, heating from 30° C. to 800° C. under nitrogen using a heating rate of 10° C./min.

The synthesis of PEKK polymers is described in the literature and typically comprises a step of polycondensing the monomers in a solvent, in order to obtain the PEKK polymer, and a step of extracting the solvent and the salts.

In a preferred embodiment of the present invention, the polycondensation of the monomers takes place in the absence of a Lewis acid or takes place in the presence of an amount of Lewis acid of less than 2 wt. %, based on the total weight of the monomers, preferably less than 1 wt. %, more preferably less than 0.5 wt. %.

In the context of the present invention, the Lewis acid may be defined as selected from the group consisting of $BF_3$, $AlCl_3$, $FeCl_3$, $CF_3SO_3H$ and $CH_3SO_3H$.

According to an embodiment, the polymeric component of the part material further comprises a polymer P2 which is a poly(aryl ether sulfone) (PAES), more precisely a poly(biphenyl ether sulfone) (PPSU).

A poly(biphenyl ether sulfone) polymer is a polyarylene ether sulfone which comprises a biphenyl moiety. Poly(biphenyl ether sulfone) is also known as polyphenyl sulfone (PPSU) and for example results from the condensation of 4,4'-dihydroxybiphenyl (biphenol) and 4,4'-dichlorodiphenyl sulfone.

For the purpose of the present invention, a poly(biphenyl ether sulfone) (co)polymer (PPSU) comprises recurring units ($R_{PPSU}$) of formula (L):

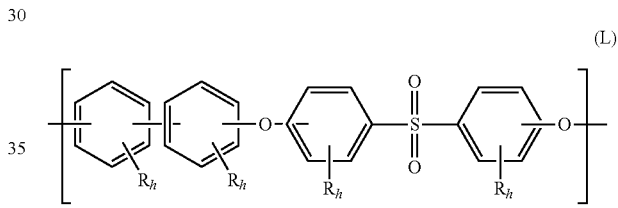

wherein
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
h, for each R, is independently zero or an integer ranging from 1 to 4 (for example 1, 2, 3 or 4).

According to an embodiment, R is, at each location in formula (L) above, independently selected from the group consisting of a C1-C12 moeity optionally comprising one or more than one heteroatoms; sulfonic acid and sulfonate groups; phosphonic acid and phosphonate groups; amine and quaternary ammonium groups.

According to an embodiment, h is zero for each R. In other words, according to this embodiment, the PPSU comprises recurring units ($R_{PPSU}$) according to formula (L'):

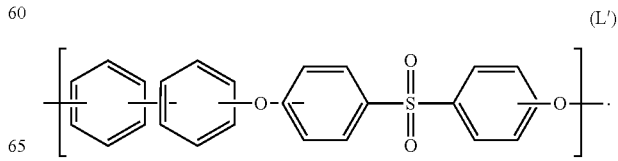

According to another embodiment of the present invention, the PPSU comprises recurring units ($R_{PPSU}$) of formula (L''):

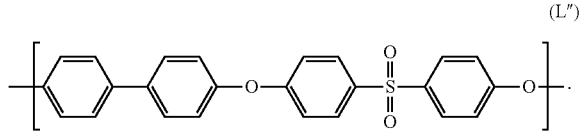

(L'')

The PPSU polymer of the present invention can therefore be a homopolymer or a copolymer. If it is a copolymer, it can be a random, alternate or block copolymer.

According to an embodiment of the present invention, at least 50 mol. %, at least 60 mol. %, at least 70 mol. %, at least 80 mol. %, at least 90 mol. %, at least 95 mol. %, at least 99 mol. % or all of the recurring units in the PPSU are recurring units ($R_{PPSU}$) of formula (L) and/or formula (L') and/or formula (L'').

Polyetherimide (PEI)

As used herein, a poly(ether imide) (PEI) comprises recurring units ($R_{PEI}$) comprising at least one aromatic ring, at least one imide group, as such and/or in its amic acid form, and at least one ether group. Recurring units ($R_{PEI}$) may optionally further comprise at least one amide group which is not included in the amic acid form of an imide group. Preferably, the PEI comprises at least 50 mol. % of recurring units ($R_{PEI}$), based on the total number of moles in the polymer.

According to an embodiment, the recurring units ($R_{PEI}$) are selected from the group consisting of following formulas (I), (II), (III), (IV), (V) and mixtures thereof:

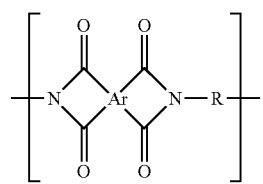
(I)

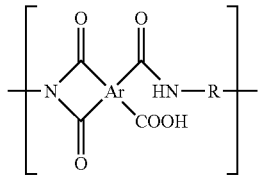
(II)

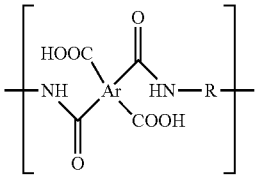
(III)

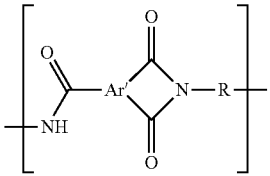
(IV)

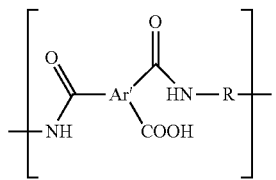
(V)

where
Ar is a tetravalent aromatic moiety and is selected from the group consisting of a substituted or unsubstituted, saturated, unsaturated or aromatic monocyclic and polycyclic group having 5 to 50 carbon atoms;

Ar' is a trivalent aromatic moiety and is selected from the group consisting of a substituted, unsubstituted, saturated, unsaturated, aromatic monocyclic and aromatic polycyclic group having from 5 to 50 C atoms; and R is selected from the group consisting of substituted and unsubstituted divalent organic radicals, optionally comprising one or several heteroatoms, e.g. N, O or S, for example selected from the group consisting of:

(a) one or several aromatic hydrocarbon radicals, each radical having 6 to 20 carbon atoms, preferably 6 carbon atoms, as well as halogenated derivatives thereof;

(b) one or several straight or branched chain alkylene radicals, each radical having 2 to 20 carbon atoms;

(c) one or several cycloalkylene radicals, each radical having 3 to 20 carbon atoms; and (d) divalent radicals of formula (VI):

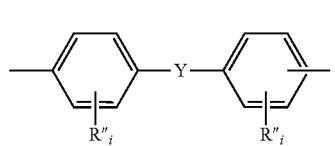
(VI)

where
Y is selected from the group consisting of alkylenes of 1 to 6 carbon atoms, for example —C(CH$_3$)$_2$— and —C$_n$H$_{2n}$— (n being an integer from 1 to 6); perfluoroalkylenes of 1 to 6 carbon atoms, for example —C(CF$_3$)$_2$— and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the proviso that at least one of Ar, Ar' and R comprises at least one ether group and that the ether group is present in the polymer chain backbone.

According to an embodiment, Ar is selected from the group consisting of formulas:

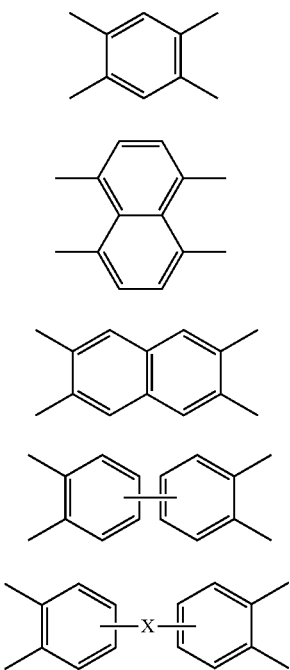

(VII)

(VIII)

(IX)

(X)

(XI)

where
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—; or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment, Ar' is selected from the group consisting of formulas:

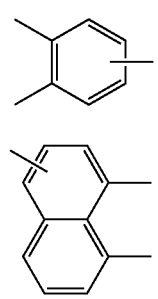

(XII)

(XIII)

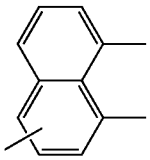

(XIV)

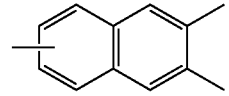

(XV)

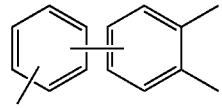

(XVI)

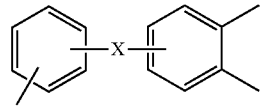

(XVII)

wherein:
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—; or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment of the present disclosure, at least 50 mol. %, at least 60 mol. %, at least 70 mol. %, at least 80 mol. %, at least 90 mol. %, at least 95 mol. %, at least 99 mol. % or all of the recurring units in the polymers are recurring units (R$_{PEI}$) of formulas (I), (II), (III), (IV), (V) and/or mixtures thereof, as defined above.

According to an embodiment, the PEI of the present invention comprises recurring units according to formula (I) above, wherein Ar is an unsubstituted aromatic ring having 6 carbon atoms and wherein R comprises several heteroatoms and consists of one or several aromatic hydrocarbon radicals, each radical having 6 to 20 carbon atoms, preferably 6 carbon atoms. Preferably, according to this embodiment, R comprises 4 aromatics rings, each comprising 6 carbon atoms.

According to an embodiment, the PEI of the present invention comprises recurring units (R$_{PEI}$) according to formula (XVIII) below:

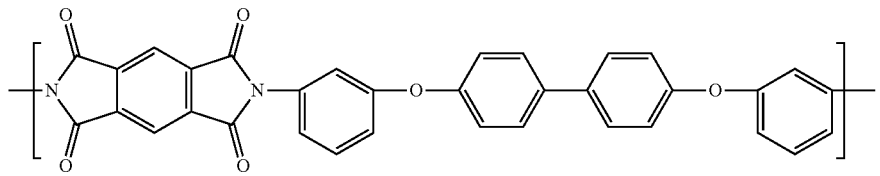

(XVIII),
for example at least 50 mol. %, at least 60 mol. %, at least 70 mol. %, at least 80 mol. %, at least 90 mol. %, at least 95 mol. %, at least 99 mol. % or all of the recurring units in the polymer are recurring units ($R_{PEI}$) of formula (XVIII), based on the total number of moles in the polymer.

According to an embodiment, a poly(ether imide) (PEI) denotes any polymer comprising at least 50 mol. %, based on the total number of moles in the polymer, of recurring units ($R_{PEI}$) of formula (XIX);

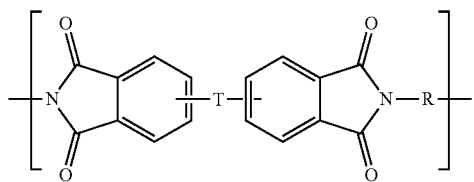

(XIX)

wherein
R is selected from the group consisting of substituted and unsubstituted divalent organic radicals, optionally comprising one or several heteroatoms, e.g. N, O or S, for example selected from the group consisting of:
(a) one or several aromatic hydrocarbon radicals, each radical having 6 to 20 carbon atoms, preferably 6 carbon atoms, as well as halogenated derivatives thereof;
(b) one or several straight or branched chain alkylene radicals, each radical having 2 to 20 carbon atoms;
(c) one or several cycloalkylene radicals, each radical having 3 to 20 carbon atoms; and
(d) divalent radicals of formula (VI):

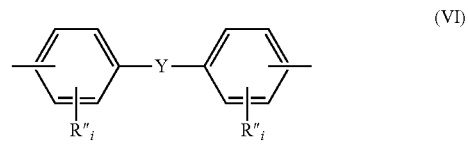

(VI)

where
Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and
R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and
i, for each R", is independently zero or an integer ranging from 1 to 4, with the provision that at least one of Ar, Ar' and R comprise at least one ether group and that the ether group is present in the polymer chain backbone.
T can either be
—O— or —O—Ar"—O—
wherein the divalent bonds of the —O— or the —O—Ar"—O— group are in the 3,3', 3,4', 4,3', or the 4,4' positions, wherein Ar" is a aromatic moiety selected from the group consisting of a substituted or unsubstituted, saturated, unsaturated or aromatic monocyclic and polycyclic group having 5 to 50 carbon atoms, for example a substituted or unsubstituted phenylene, a substituted or unsubstituted biphenyl group, a substituted or unsubstituted naphtalene group or a moiety comprising two substituted or unsubstituted phenylene.
According to an embodiment of the present disclosure, Ar" is of the general formula (VI), as detailed above; for example, Ar" is of formula (XX):

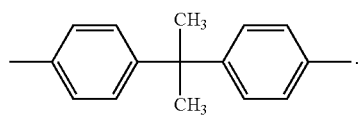

(XX)

The polyetherimides (PEI) of the present invention may be prepared by any of the methods well-known to those skilled in the art including the reaction of a diamino compound of the formula H$_2$N—R—NH$_2$ (XXI), where R is as defined before, with any aromatic bis(ether anhydride)s of the formula (XXII):

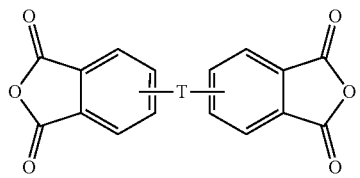

(XXII)

where T as defined before.
In general, the preparation of these polymers can be carried out in solvents, e.g., o-dichlorobenzene, m-cresol/toluene, N,N-dimethylacetamide, at temperatures ranging from 20° C. to 250° C.
Alternatively, these polymers can be prepared by melt polymerization of any dianhydrides of formula (XXII) with any diamino compound of formula (XXI) while heating the mixture of the ingredients at elevated temperatures with concurrent intermixing.

The aromatic bis(ether anhydride)s of formula (XXII) include, for example:
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4 (3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)diphenyl-2,2-propane dianhydride; and mixtures of such dianhydrides.

The organic diamines of formula (XXI) are chosen from the group consisting of m-phenylenediamine, p-phenylenediamine, 2,2-bis(p-aminophenyl)propane, 4,4'-diaminodiphenyl-methane, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, and mixtures thereof; preferably, the organic diamines of formula (XX) are chosen from the group consisting of m-phenylenediamine and p-phenylenediamine and mixture thereof.

According to an embodiment, a poly(ether imide) (PEI) comprises at least 50 mol. %, based on the total number of moles in the polymer, of recurring units ($R_{PEI}$) of formulas (XXIV) or (XXV), in imide forms, or their corresponding amic acid forms and mixtures thereof:

The part material (M) can comprise only one PEI polymer. Alternatively, it can comprise several PEI, for example two, three, or even more than three PEI, as well as optionally one or several polymers P2.

In a specific embodiment, the PEI polymer has a weight average molecular weight (Mw) of 10,000 to 150,000 g/mol, as measured by gel permeation chromatography, using a polystyrene standard.

In a specific embodiment, the PEI polymer has an intrinsic viscosity greater than 0.2 deciliters per gram (dl/g), beneficially 0.35 to 0.7 dl/g measured in m-cresol at 25° C.

According to the present invention, the melt flow rate or melt flow index (at 337° C. under a weight of 6.6 kg according to ASTM D1238) (MFR or MFI) of the PEI may be from 0.1 to 40 g/10 min, for example from 2 to 30 g/10 min or from 3 to 25 g/10 min.

In a specific embodiment, the PEI polymer has a Tg ranging from 160° C. and 240° C., as measured by differential scanning calorimetry (DSC) according to ASTM D3418, for example ranging from 170 and 230° C., from 180 and 220° C.

Optional Components

The part material (M) of the present invention may further comprise one or several additives, such as lubricants, heat stabilizers, light stabilizers, antioxidants, pigments, processing aids, dyes, fillers, nanofillers or electromagnetic absorbers. Examples of these optional additives are titanium dioxide, zinc oxide, cerium oxide, silica or zinc sulphide, glass fibers, carbon fibers.

The part material (M) of the present invention may further comprise flame retardants such as halogen and halogen free flame retardants.

Method for Making a Three-Dimensional (3 D) Object

The additive manufacturing (AM) method for making a three-dimensional (3 D) object of the present invention comprises a step consisting in extruding the part material (M).

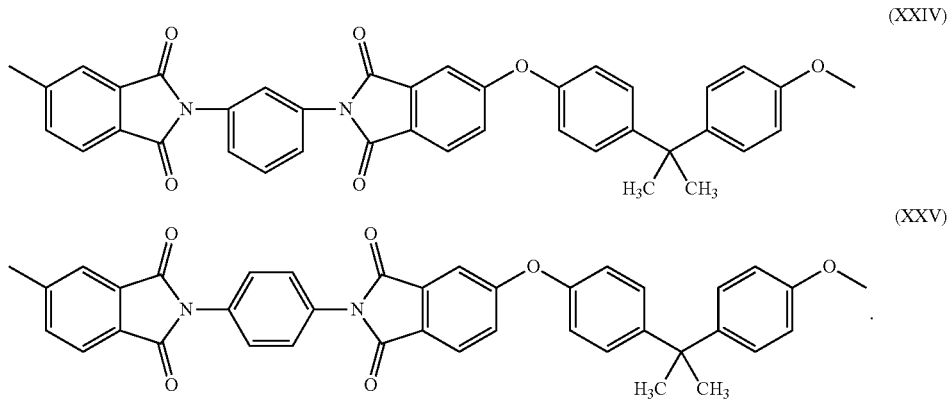

(XXIV)

(XXV)

In a preferred embodiment of the present invention, at least 50 mol. %, at least 60 mol. %, at least 70 mol. %, at least 80 mol. %, at least 90 mol. %, at least 95 mol. %, at least 99 mol. % or all of the recurring units in the PEI are recurring units ($R_{PEI}$) of formulas (XXIV) or (XXV), in imide forms, or their corresponding amic acid forms and mixtures thereof.

Such aromatic polyimides are notably commercially available from Sabic Innovative Plastics as ULTEM® polyetherimides.

The method of the invention usually takes place using an additive manufacturing system, or a printer, also called a 3 D printer.

The method of the invention may also comprise at least one of the following steps, in connection with the 3 D printer:

feeding the part material (M) to a discharge head member having a throughbore ending with a discharge tip and a circumferential heater to melt the material (M) in the throughbore;

heating the part material (M) to a temperature of at least 350° C., prior to extrusion;

compressing the part material (M) with a piston, for example with the unmelted filament acting as a piston, in the throughbore;

ensuring relative movement in X- and Y-directions of the discharge tip and of a receiving platform while discharging part material (M) on the receiving platform to form the cross sectional shape;

ensuring relative movement in the Z-direction of the discharge tip and the receiving platform while discharging part material (M) on the receiving platform to form the 3 D object or part in elevation.

The 3 D object/article/part may be built on substrate, for example a horizontal substrate and/or on a planar substrate. The substrate may be moveable in all directions, for example in the horizontal or vertical direction. During the 3 D printing process, the substrate can, for example, be lowered, in order for the part material to be extruded on top of the former layer of polymeric material.

According to an embodiment, the process further comprises a step consisting in producing a support structure. According to this embodiment, the 3 D object/article/part is built upon the support structure and both the support structure and the 3 D object/article/part are produced using the same AM method. The support structure may be useful in multiple situations. For example, the support structure may be useful in providing sufficient support to the printed or under-printing, 3 D object/article/part, in order to avoid distortion of the shape 3 D object/article/part, especially when this 3 D object/article/part is not planar. This is particularly true when the temperature used to maintain the printed or under-printing, 3 D object/article/part is below the re-solidification temperature of the powder.

While not strictly necessary, the 3 D object/article/part may also be subjected to heat-treatment after manufacture (also called annealing or tempering). In this case, the 3 D object/article/part may be placed in an oven set up at a temperature ranging from 170 to 260° C., preferably from 180 to 220° C., for a period of time of ranging from about 30 minutes to 24 hours, preferably from 1 hour to 8 hours.

The 3 D object of the present invention preferably presents a level of crystallinity corresponding to a enthalpy of fusion or heat of fusion of at least 30 J/g, as measured prior to any annealing heat treatment on a second heat scan in a differential scanning calorimeter (DSC) according to ASTM D3418, using a heating rate of 20° C./min and calculated as the difference between the absolute value of the melting endotherm area minus the absolute value of any crystallization endotherm that may be detected during the first heat up scan. In some embodiments, the heat of fusion of the 3 D object as printed prior to any heat treatment and as measured according to the above description is at least 32 J/g, at least 33 J/g or at least 34 J/g.

The 3 D object of the present invention preferably presents a Z-direction tensile stress at yield or break greater than about 50% of the x-y direction tensile stress at yield or break, preferably at least 55%, even more preferably 60%.

Part Material (M)

The part material (M) of the present invention can be made by methods well known to the person of ordinary skill in the art. For example, such methods include, but are not limited to, melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from about 290-440° C., from about 300-430° C. or from about 310-420° C. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the part material, the components of the part material, i.e. PEKK polymer, PEI polymer, optional polymers (P2) and optionally additives, are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

The part material may for example be used in the form of pellets in Pellet Additive Manufacturing (PAM) 3D printing processes.

When the part material is in the form of pellets, the pellets may have a size ranging from 1 mm to 1 cm, for example from 2 mm to 5 mm or from 2.5 mm to 4.5 mm.

Filament Material

The present invention also relates to a filament material (F) comprising a polymer component comprising at least one PEKK polymer and at least one PEI polymer, as above-described.

According to an embodiment, the polymeric component of the filament material comprises:

from 55 to 99 wt. % of at least one poly(ether ketone ketone) (PEKK) polymer, and from 1 to 45 wt. % of at least one poly(ether imide) (PEI) polymer, based on the total weight of the polymer component.

According to this aspect of the invention, the PEKK and PEI polymer are as described above.

According to an embodiment, the filament material further comprises one or several polymer P2 which is a poly(biphenyl ether sulfone) (co)polymer (PPSU), more preferably a poly(biphenyl ether sulfone) (co)polymer (PPSU) of Mw ranging from 47,000 to 57,000 g/mol.

This filament material is well-suited for use in a method for manufacturing a three-dimensional object.

The filament may have a cylindrical or substantially cylindrical geometry, or may have a non-cylindrical geometry, such as a ribbon filament geometry; further, filament may have a hollow geometry, or may have a core-shell geometry, with the support material of the present invention being used to form either the core or the shell.

When the filament has a cylindrical geometry, its diameter may vary between 0.5 mm and 5 mm, for example between 0.8 and 4 mm or for example between 1 mm and 3.5 mm. The diameter of the filament can be chosen to feed a specific FFF 3D printer. An example of filament diameter used extensively in FFF process is 1.75 mm or 2.85 mm diameter. The accuracy of the filament diameter is +/−200 microns, for example +/−100 microns or +/−50 microns.

The filament of the present invention can be prepared from a two-step process in which a compound is first produced to make part material in pellet form, and then the pellets are extruded to produce the filament. Alternatively, the filament of the present invention can be prepared from an integrated process in which the compounds and the filaments are prepared in a one-step process.

The filament of the present invention can be made from the part material by methods including, but not limited to, melt-mixing processes. Melt-mixing processes are typically carried out by heating the polymer components above the highest melting temperature and glass transition temperature of the thermoplastic polymers thereby forming a melt of the thermoplastic polymers. In some embodiments, the processing temperature ranges from about 280-450° C., preferably from about 290-440° C., from about 300-430° C. or from about 310-420° C.

The process for the preparation of the filament can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the filament, the components of the part material are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

The method for manufacturing the filaments also comprises a step of extrusion, for example with a die. For this purpose, any standard molding technique can be used; standard techniques including shaping the polymer compositions in a molten/softened form can be advantageously applied, and include notably compression molding, extrusion molding, injection molding, transfer molding and the like. Extrusion molding is preferred. Dies may be used to shape the articles, for example a die having a circular orifice if the article is a filament of cylindrical geometry.

In some embodiments, the filament is obtained by a melt-mixing process carried out by heating the polymer component above its melting temperature and melt-mixing the components of the part material.

The method may comprise if needed several successive steps of melt-mixing or extrusion under different conditions.

The process itself, or each step of the process if relevant, may also comprise a step consisting in a cooling of the molten mixture.

Support Material

The method of the present invention may also employ another polymeric component to support the 3 D object under construction. This polymeric component, similar or distinct from the part material used to build a 3 D object, is hereby called support material. A support material may be required during 3D printing to provide vertical and/or lateral support to the part material under construction. The support material will need to have similar thermal properties to the part material, to the extent it can stay solid and rigid to provide the needed support to the part material in hollow or overhang regions of the part.

The support material, possibly used in the context of the present method, advantageously possesses a high melting temperature (i.e. above 260° C.), in order to resist high temperature applications. The support material may also possess a water absorption behaviour or a solubility in water at a temperature lower than 110° C., in order sufficiently swell or deform upon exposure to moisture.

According to an embodiment of the present invention, the method for manufacturing a three-dimensional object with an additive manufacturing system further comprises the steps of:

printing layers of a support structure from the support material, and removing at least a portion of the support structure from the three-dimensional object.

A variety of polymeric components can be used as a support material. Notably, support material can comprise polyamides or copolyamides, such as for example the ones described in PCT applications WO 2017/167691 and WO 2017/167692.

Applications

The present invention also relates to the use of a part material (M) comprising a polymeric component as above-described for the manufacture of three-dimensional objects.

The present invention also relates to the use of a filament material comprising a polymeric component as above-described for the manufacture of three-dimensional objects.

All of the embodiments described above with respect to the part material do apply equally to the use of the part material or the use of the filament material.

The present invention also relates to the use of a part material (M) comprising a polymeric component as above-described for the manufacture of a filament for use in the manufacture of three-dimensional objects.

The present invention also relates to 3 D objects or 3D articles obtainable, at least in part, from the method of manufacture of the present invention, using the part material herein described. These 3 D objects or 3D articles present a density comparable to injection molded objects or articles. They also present comparable or improved mechanical properties, notably stiffness (measured as the modulus of elasticity) and tensile strength.

The 3 D objects or articles obtainable by such method of manufacture can be used in a variety of final applications. Mention can be made in particular of implantable device, dental prostheses, brackets and complex shaped parts in the aerospace industry and under-the-hood parts in the automotive industry.

The haze of the 3 D objects printed from the part material (M) of the present invention preferably have a haze less than 50%, or preferably less than 40%, more preferably less than 30% less than 20%, less than 15%, less than 10%, and more preferably less than 9%.

The 3 D objects or articles obtainable by such method of manufacture can be used are used in many aircraft applications including, for example, passenger service units, staircases, window reveals, ceiling panels, information displays, window covers, ceiling panels, sidewall panels, wall partitions, display cases, mirrors, sun visors, window shades, storage bins, storage doors, ceiling overhead storage lockers, serving trays, seat backs, cabin partitions, and ducts.

Parts printed from the polymer combination of the present invention are particularly well-suited for applications where transparency is required, for example in aircraft applications (e.g. windows, lighting fixtures and partitions).

EXAMPLES

The disclosure will be now described in more detail with reference to the following examples, whose purpose is merely illustrative and not intended to limit the scope of the disclosure.

Starting Materials

PEKK: PEKK 71/29 was prepared according to the following method:

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 112.50 g of diphenyl sulfone (DPS), 23.054 g of 1,3-BHBB, 16.695 g of 1,4-BHBB and 41.172 g of 1,4-DFDK. The flask content was evacuated under vacuum and then filled with high purity nitrogen (containing less than 10 ppm $O_2$). The reaction mixture was then placed under a constant nitrogen purge (60 mL/min). The reaction mixture was heated slowly to 270° C. At 270° C., 13.725 g of $Na_2CO_3$ and 0.078 g of $K_2CO_3$ was added via a powder dispenser to the reaction mixture over 60 minutes. At the end of the addition, the reaction mixture was heated to 310° C. at 1° C./minute. After 2 minutes at 310° C., 1.207 g of 1,4-DFDK were added to the reaction mixture while keeping a nitrogen purge on the reactor. After 5 minutes, 0.741 g of lithium chloride were added to the reaction mixture. 10 minutes later, another 0.402 g of 1,4-DFDK were added to the reactor and the reaction mixture was kept at temperature for 15 minutes. Another charge of 15 g of diphenyl sulfone was added to the reaction mixture, which was kept under agitation for 15 minutes. The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4.2H_2O$ and 0.62 g of $Na_2HPO_4$ were dissolved in 1200 mL DI water for the last wash. The powder was then removed from the reactor and dried at 120° C. under vacuum for 12 hours yielding 72 g of a yellow powder.

PPSU: Rader) PPSU R-5800 NT, available from Solvay Specialty Polymers USA L.L.C.

PEI: Ultem® PEI 1000, available from Sabic Innovative Plastics

PEEK: KetaSpire® PEEK KT-880 MF, available from Solvay Specialty Polymers USA L.L.C.

PSU—polysulfone: Udel® PSU P-1850P, available from Solvay Specialty Polymers USA L.L.C.

PES—poly(ether sulfone): Veradel® PES A-301 NT, available from Solvay Specialty Polymers USA L.L.C.

TPI: Aurum® PL450C, available from Mitsui Chemicals

Example 1

Preparation of Formulations

All polymer blends were prepared by first tumbling the polymers to be compounded, in resinous form, for about 20 minutes. Then, each formulation was melt compounded using a 26 mm diameter Coperion® ZSK-26 co-rotating partially intermeshing twin screw extruder having an L/D ratio of 48:1. The barrel sections 2 through 12 and the die were heated to set point temperatures as follows: Barrels 2-6: 360° C., Barrels 7-12: 350° C., Die: 350° C. In each case, the resin blends were fed at barrel section 1 using a gravimetric feeder at throughput rates in the range 35-40 lb/hr. The extruder was operated at screw speeds of around 200 RPM. Vacuum was applied at barrel zone 10 with a vacuum level of about 27 inches of mercury. A single-hole die was used for all the compounds to give a filament approximately 2.4 to 2.5 mm in diameter and the polymer filament exiting the die was cooled in water and fed to the pelletizer to generate pellets approximately 2.0 mm in length. Pellets were annealed prior being injection molded, as follows: 2 h @ 175° C. followed by 2 h @ 200° C.

Test Methods

DSC (Tg, Tc, Heat of Fusion)

Tg is determined on the $2^{nd}$ heat scan in differential scanning calorimeter (DSC) according to ASTM D3418, using a heating and cooling rate of 20° C./min.

Tc is determined on the 1St cool scan in differential scanning calorimeter (DSC) according to ASTM D3418, using a heating and cooling rate of 20° C./min.

Heat of fusion is determined on the $2^{nd}$ heat scan in differential scanning calorimeter (DSC) according to ASTM D3418, using a heating rate of 20° C./min.

Double-Gated Injection Molding

ASTM tensile bars with and without weld lines were injection molded on a Toyo Si-110-6 F200HD injection molding machine at a mold temperature of 225° C., resulting in the formation of opaque tensile specimens, which were subsequently subject to tensile testing. To ascertain the weld line strength of these blends the weld-line strengths were measured against the base case (single-gated) with no weld line.

Tensile Strength

Tensile strength and modulus were determined according to the ASTM D638 method with ASTM Type I bars.

Transparency/Haze

Flat plastic chips were molded using a Mini-Jector with front zone 377° C. (710° F.), rear zone 377° C. (710° F.), nozzle temp 382° C. (720° F.), mold temp 93° C. (200° F.), cycle time 21 s, inject time 10 s, and pressure of 39 atm (570 psi). ASTM D-1003 provides a measuring method for haze. Haze is the ratio of diffused light transmittance to the total light transmittance expressed as a percent.

The components and their respective amounts in the test bars (according to the present disclosure or comparative) and the mechanical properties of the same are reported in Tables 1-3 below (5 test bars/mean value).

Results

TABLE 1

|  | 1 | 2 | 3 | 4 |
|---|---|---|---|---|
| C: comparative | C | C | I | C |
| I: according to the disclosure |  |  |  |  |
| PEKK | 100 | 83 | 83 | 83 |

TABLE 1-continued

|  | 1 | 2 | 3 | 4 |
|---|---|---|---|---|
| PPSU |  | 17 |  |  |
| PEI |  |  | 17 |  |
| PEEK |  |  |  | 17 |
| Tg, $2^{nd}$ heat (° C.) | 164 | 170 | 176 | 163 |
| Tc, $1^{st}$ cool (° C.) | 275 | 253 | 258 | 269 |
| Heat fusion, $2^{nd}$ heat (J/g) | 48 | 33 | 36 | 46 |
| Modulus of Elasticity (GPa) | 4.2 ± 0 | 3.9 ± 0.2 | 3.9 ± 0 | 4.3 ± 0.1 |
| Tensile strength (MPa) | 95.8 ± 7.2 | 93.8 ± 12.3 | 108.2 ± 12.1 | 117.9 ± 2.2 |
| Nominal Tensile Strain at Break (%) | 2.9 ± 0.3 | 3.4 ± 0.6 | 4.6 ± 1 | 5.4 ± 3.5 |
| Haze | 47.49 | 11.22 | 8.71 | 44.62 |

TABLE 2

|  | 5 | 6 | 7 |
|---|---|---|---|
| C: comparative | C | C | C |
| I: according to the disclosure |  |  |  |
| PEKK | 83 | 83 | 83 |
| PSU | 17 |  |  |
| PES |  | 17 |  |
| TPI |  |  | 17 |
| Tg, $2^{nd}$ heat (° C.) | 166 | 166 | 167 |
| Tc, $1^{st}$ cool (° C.) | 276 | 274 | 282 |
| Heat fusion, $2^{nd}$ heat (J/g) | 37 | 38 | 37 |
| Modulus of Elasticity (GPa) | 3.8 ± 0 | 4 ± 0 | 4.2 ± 0.2 |
| Tensile strength (MPa) | 47.8 ± 4 | 50.3 ± 5 | 91.7 ± 9.5 |
| Nominal Tensile Strain at Break (%) | 1.4 ± 0.1 | 1.4 ± 0.1 | 3.1 ± 0.5 |
| Haze | not measured (fully opaque) | not measured (fully opaque) | 8.02 |

The inventive blend of PEKK and PEI (Ex3) provides a good set of properties, that-is-to say a good compromise of both mechanical and optical properties, in comparison with other PEKK/amorphous resins.

Example 2

The formulations 8-12 of example 2 were prepared according to the method described in example 1 and the same test methods were applied to the formulations, except that these formulations were melt compounded with a different process, described as follows: The formulations were melt compounded using an 18 mm Leistritz co-rotating intermeshing twin screw extruder. The extruder had 6 barrel zones with the following set points: barrels 2 through 5 being heated (corresponding to zones 1 through 4): 360° C.; Barrel 6: 350° C.; Adapter: 350° C.; Die: 350° C. In each case, the resin blends were fed at barrel section 1 using a gravimetric feeder at throughput rates in the range 15-17 lb/hr. The extruder was operated at screw speeds of around 125 RPM. A single-hole die was used for all the compounds to give a filament approximately 2.4 to 2.5 mm in diameter and the polymer filament exiting the die was cooled in water and fed to the pelletizer to generate pellets approximately 2.0 mm in length. Pellets were annealed prior being injection molded, as follows: 2 h @ 175° C. followed by 2 h @ 200° C.

|  | 8 | 9 | 10 | 11 | 12 |
|---|---|---|---|---|---|
| PEKK | 95 | 90 | 83 | 75 | 60 |
| PEI | 5 | 10 | 17 | 25 | 40 |

-continued

|  | 8 | 9 | 10 | 11 | 12 |
|---|---|---|---|---|---|
| Tg, $2^{nd}$ heat (° C.) | 168 | 170 | 176 | 175 | 183 |
| Tc, $1^{st}$ cool (° C.) | 282 | 274 | 258 | 266 | 250 |
| Heat fusion, $2^{nd}$ heat (J/g) | 45 | 42 | 36 | 32 | 25 |

PEKK alone has a heat of fusion on $2^{nd}$ heat of 48 J/g, whereas 25 wt. % Ultem® (Ex 11) is 32 J/g and 40 wt. % Ultem® (Ex 12) is 25 J/g. These crystallinities≤32 J/g are too low for printing the part material in a chamber heated at a temperature above the Tg of the blend, which is necessary to induce crystallization in the part. In other words, the 3 D printed structures printed from formulations 11 and 12 are not self-supporting. Hence these blends with ΔHf of 32 J/g or less can only be printed by setting the chamber temperature at or below the blend Tg. Under these conditions, the printed part will be essentially amorphous.

The invention claimed is:

1. An additive manufacturing (AM) method for making a three-dimensional (3 D) object, comprising extruding a part material (M) comprising a polymer component consisting of:
   from 80 to 99 wt. % of at least one poly (ether ketone ketone) (PEKK) polymer, and
   from 1 to 15 wt. % of at least one poly (ether imide) (PEI) polymer, based on the total weight of the polymer component,
wherein the PEKK comprises at least one recurring unit ($R^M$) and at least one recurring unit ($R^P$), wherein recurring unit ($R^M$) is represented by formula (I):

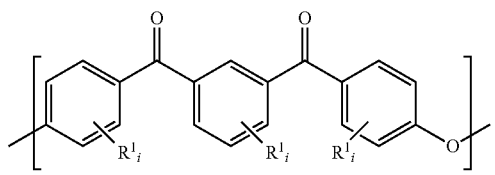

and recurring unit ($R^P$) is represented by formula (II):

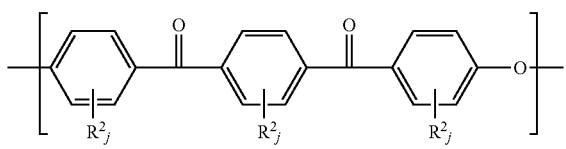

wherein:
  each $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
  each i and j, at each instance, is an independently selected integers ranging from 0 to 4, and wherein the PEKK has a ratio of recurring units ($R^P$)/($R^M$) ranging from 65/35 to 95/5, and wherein the PEI is a poly (ether imide) (PEI) polymer comprises at least 50 mol. %, based on the total number of moles in the polymer, of recurring units ($R_{PEI}$) of formulas (XXIV) or (XXV), in imide forms, or their corresponding amic acid forms and mixtures thereof:

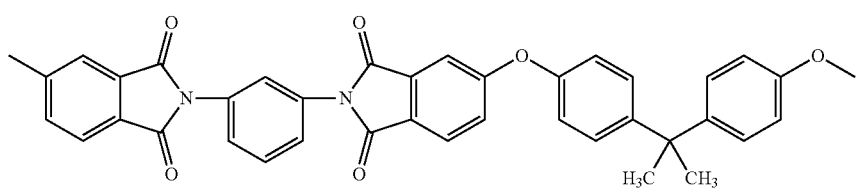

(XXIV)

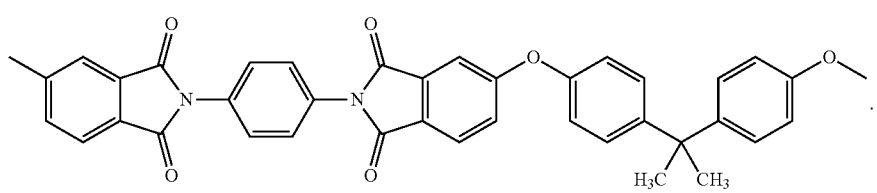

(XXV)

2. The method of claim 1, wherein the PEKK consists essentially in recurring units ($R^P$) and ($R^M$).

3. The method of claim 1, wherein the part material (M) further comprises 0.1 wt. % to 60 wt. %, with respect to the total weight of the part material, of an additive selected from the group consisting of flow agents, fillers, colorants, lubricants, plasticizers, stabilizers, flame retardants, nucleating agents and combinations thereof.

4. The method of claim 1, wherein the part material (M) is the shape of a filament having a cylindrical or ribbon-like geometry, its diameter or at least one of its sections having a size varying between 0.5 mm and 5 mm.

5. The method of claim 1, wherein the part material (M) is the form of pellets having a size ranging from 1 mm to 1 cm.

6. The method of claim 1, wherein the part material (M) comprises a polymer component comprising:
  from 85 to 99 wt. % of at least one poly (ether ketone ketone) (PEKK) polymer, and
  from 1 to 15 wt. % of at least one poly (ether imide) (PEI) polymer, based on the total weight of the polymer component.

7. A method of manufacturing a 3 D object, the method comprising using of a part material (M) comprising a polymer component consisting of:
  from 80 to 99 wt. % of at least one poly (ether ketone ketone) (PEKK) polymer, and
  from 1 to 20 wt. % of at least one poly (ether imide) (PEI) polymer, based on the total weight of the polymer component in the part material (M), for the manufacture of a 3 D object using an extrusion-based 3 D printing method, wherein the PEKK comprises at least one recurring unit ($R^M$) and at least one recurring unit ($R^P$), wherein recurring unit ($R^M$) is represented by formula (I):

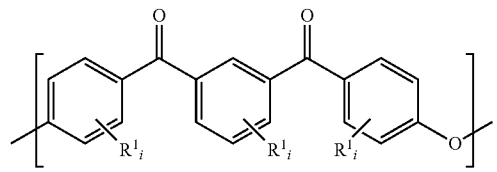

and recurring unit ($R^P$) is represented by formula (II):

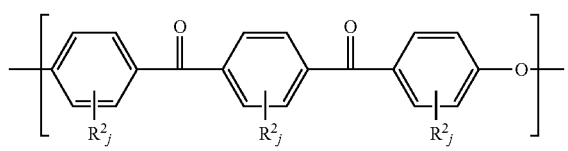

wherein:

each $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and each i and j, at each instance, is an independently selected integers ranging from 0 to 4, and wherein the PEKK has a ratio of recurring units $(R^P)/(R^M)$ ranging from 65/35 to 95/5.

8. The method according to claim 1, wherein the PEI exhibits a melt flow rate (at 337° C. under a weight of 6.6 kg according to ASTM D1238) from 3 to 25 g/10 min.

* * * * *